US008412815B2

(12) United States Patent
Brownholtz et al.

(10) Patent No.: US 8,412,815 B2
(45) Date of Patent: *Apr. 2, 2013

(54) ALERT LOG ACTIVITY THREAD INTEGRATION

(75) Inventors: Elizabeth A. Brownholtz, Westford, MA (US); Werner Geyer, Cambridge, MA (US); Martin T. Moore, Westford, MA (US); Michael Muller, Cambridge, MA (US); Shilad W. Sen, Minneapolis, MN (US); Michael C. Wu, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/911,705

(22) Filed: Oct. 25, 2010

(65) Prior Publication Data

US 2011/0041081 A1 Feb. 17, 2011

Related U.S. Application Data

(62) Division of application No. 11/617,094, filed on Dec. 28, 2006, now Pat. No. 7,822,848.

(51) Int. Cl.
*G06F 15/173* (2006.01)
(52) U.S. Cl. ........ 709/224; 709/201; 709/202; 709/223; 709/225; 715/710

(58) Field of Classification Search .................. 709/201, 709/202, 205, 223, 224, 225; 715/710
See application file for complete search history.

(56) References Cited

U.S. PATENT DOCUMENTS

| 6,425,006 | B1 * | 7/2002 | Chari et al. | 709/224 |
| 6,507,852 | B1 * | 1/2003 | Dempsey et al. | 1/1 |
| 6,553,416 | B1 * | 4/2003 | Chari et al. | 709/224 |
| 6,697,970 | B1 * | 2/2004 | Chisholm | 714/48 |
| 7,430,598 | B2 * | 9/2008 | Raden et al. | 709/224 |
| 2005/0038888 | A1 * | 2/2005 | Labertz | 709/224 |

* cited by examiner

*Primary Examiner* — Liangche A Wang
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to alert management in an activity-centric collaborative computing environment and provide a novel and non-obvious method, system and computer program product for activity thread integration of an alert log. In one embodiment of the invention, an alert log activity thread integration method can be provided. The method can include logging a reference to an alert for an activity in an activity thread, and, in response to the selection of the alert from within the activity thread, displaying the content of the alert. For instance, logging a reference to an alert for an activity in an activity thread can include creating a branch of the activity thread for inserting all alerts pertaining to the activity and inserting the reference to the alert in the created branch.

6 Claims, 2 Drawing Sheets

ALERT LOG ACTIVITY THREAD INTEGRATION

CROSS-REFERENCE TO RELATED APPLICATIONS

This application is a Divisional of U.S. application Ser. No. 11/617,094, filed Dec. 28, 2006, entitled "ALERT LOG ACTIVITY THREAD INTEGRATION," the entirety of which is incorporated herein by reference.

BACKGROUND OF THE INVENTION

1. Field of the Invention

The present invention relates to the field of alert management for computing events and more particularly to user interface alert bubbles for computing events 2. Description of the Related Art Alert management in a computing system refers to the alerting of an end user through a user interface of a computing application of a computing event. Computing applications and systems often encounter computing events worth noting on the part of the end user. Historically, alerting an end user of a computing event required the suspension of an executing application and the presentation of text or a visual display notifying the end user of an alert condition. While effective in a computing environment in which only a single application can execute at a time, for multi-tasking environments, it is not reasonable to permit the interruption of all applications to present an alert.

In traditional windowing operating systems that provide multi-tasking functionality, alert management is incorporated into the operating system itself. In this regard, the operating system can provide an application programming interface (API) for invoking alerts through the operating system user interface. Often in the form of an alert box or an alert balloon, an alert can be provided by invoking a suitable operation through the alert management API. The alert itself, can be raised from a task bar or other similar such user interface structure.

In an activity-centric collaborative computing environment, alerts often are generated whenever an object within an activity becomes manipulated or managed in some meaningful way, by another user or by the action of the user's own system or a remote system. Alerts can be generated and delivered to individuals associated with an object (members), for instance when a member opens the object, when a member modifies the object, or when a member creates a child of the object. As will be recognized by the skilled artisan, alerts are ephemeral in nature and persist in the end user display only for a few moments. During the brief display of an alert, an alert recipient may take one of several actions with regard to the contents of the alert. These actions may include opening the object that is referenced in the alert, rating the desirability of viewing like alerts, or dismissing the alert.

Of course, if the user fails to notice an alert, perhaps because the user is not present during the presentation of alert, or because the user becomes distracted, the user may miss a vital piece of dynamic information. This problem may be mitigated by making each alert persistent until explicitly dismissed by the user, but this solution leads to further problems, such as a screen that is cluttered with alert messages, and the requirement that the user interrupt her/his on-going work to dismiss the alerts.

BRIEF SUMMARY OF THE INVENTION

Embodiments of the present invention address deficiencies of the art in respect to alert management in an activity-centric collaborative computing environment and provide a novel and non-obvious method, system and computer program product for activity thread integration of an alert log. In one embodiment of the invention, an alert log activity thread integration method can be provided. The method can include logging a reference to an alert for an activity in an activity thread, and, in response to the selection of the alert from within the activity thread, displaying the content of the alert. For instance, logging a reference to an alert for an activity in an activity thread can include creating a branch of the activity thread for inserting all alerts pertaining to the activity, inserting the reference to the alert in the created branch, and displaying at least a portion of the created branch in the activity thread.

In one aspect of the embodiment, displaying the content of the alert can include displaying in addition to the content of the alert, an indication of when the alert previously had been issued. In another aspect of the embodiment, displaying the content of the alert can include displaying in addition to the content of the alert, a listing of members associated with the activity to which the alert previously had been issued. In yet another aspect of the embodiment, displaying the content of the alert further can include additionally displaying an indication of respective actions taken by the members in response to having received the alert. Finally, in even yet another aspect of the embodiment, displaying the content of the alert further can include additionally displaying an indication of respective alert ratings provided by the members in response to having received the alert.

In another embodiment of the invention, an activity-centric collaboration data processing system can be configured for alert management. The system can include an activity-centric collaboration tool and an activity map provided by the activity-centric collaboration tool and configured to display an activity thread for an activity. Finally, the system can include alert log management logic. The logic can include program code enabled to log a reference to an alert for the activity in the activity thread, and in response to the selection of the alert from within the activity thread, to display the content of the alert. An alert log also can be disposed in the activity thread as a branch of the activity thread containing only previously issued alerts. As such, the activity log can include individual references to different, previously issued alerts.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for activity thread integration of an alert log. In accordance with an embodiment of the present invention, an alert log can be inserted into an activity thread in an activity-centric collaborative application. The alert log can include one or more previously issued alerts, each alert being associated with a member of the activity thread accessing the alert. Each alert within the alert log can include not only the content of a corresponding previously issued alert, but also a time when the previously issued alert had been issued. Optionally, a list of members who had received the previously issued alert along with any actions taken in response by the members in the list and how those members in the list rated the previously issued alert.

Figure 1:
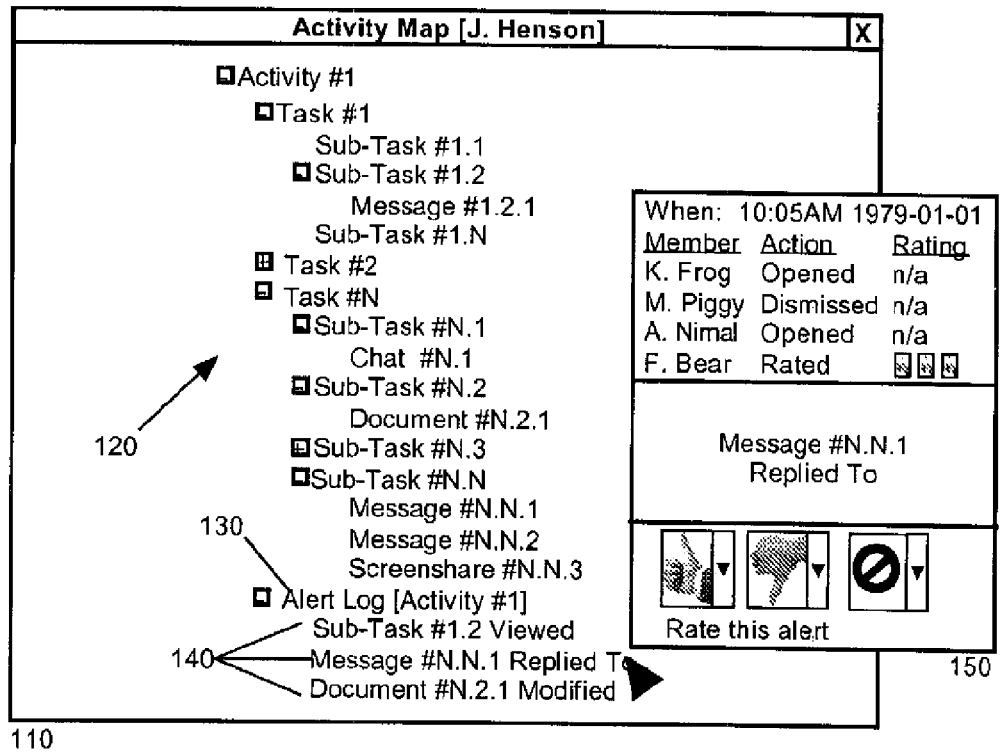
FIG. 1 is a pictorial illustration of an activity map configured for activity thread integration of an alert log.

In further illustration, FIG. 1 is a pictorial illustration of an activity map 110 configured for activity thread integration of an alert log. The activity map 110 can include an activity thread 120 for an activity. The activity thread 120 can include a hierarchical arrangement of objects such as tasks, sub-tasks, messages, screen shares, documents and the like, all related to the completion of an activity. Notably, an alert log 130 can be included in the activity thread 120 for the activity. The alert log 130 can include one or more references to previously issued alert 140 to members of the activity.

In this regard, each reference to a previously issued alert 140 can be activated for selection. Responsive to the selection of a reference to a previously issued alert 140 in the activity thread 120, a corresponding alert 150 can be rendered for viewing. The corresponding alert 150 can include the content of the previously issued alert associated with the reference to the previously issued alert 140 in the activity map 120. Additionally, the corresponding alert 150 can include an indication of when the previously issue alert had been issued, the members to which the previously issued alert had been issued, any actions taken by those members in response to the previously issued alert, and any ratings applied by the members to the previously issued alert.

Figure 2:
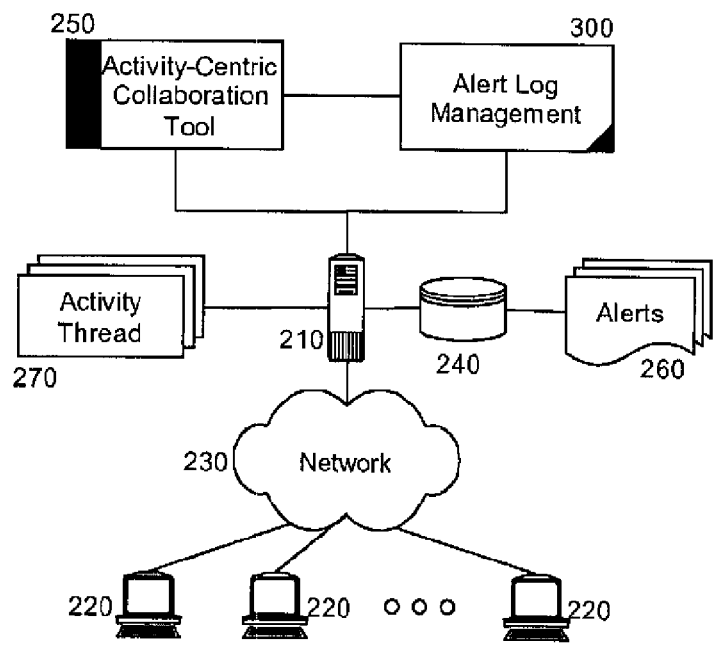
FIG. 2 is a schematic illustration of an activity-centric collaborative data processing system configured for activity thread integration of an alert log; and, FIGS. 3 and 4, taken together, are a flow chart illustrating a process for activity thread integration of an alert log.

In yet further illustration, FIG. 2 is a schematic illustration of an activity-centric collaborative data processing system configured for activity thread integration of an alert log. The system can include a host computing platform 210 coupled to one or more client computing platforms 220 over a computer communications network 230. The host computing platform 210 can support the operation of an activity-centric collaboration tool 250 such as the Activity Explorer™ of the Lotus Workplace™ family of products manufactured by IBM Corporation of Armonk, N.Y., United States.

The activity-centric collaboration tool can manage the use and modification of one or more activity threads 270. Each of the activity threads 270 can include one or more activity objects arranged hierarchically to represent tasks desired to drive an activity through its intended lifecycle and resulting work product, messages and communications generated in the course of driving the activity through its intended lifecycle. Notably, one or more alerts 260 can be generated in association with the access, modification and response to activity objects in the activity thread 270. The alerts 260 can be stored in fixed storage 240 coupled to the host computing platform 210 and enabled for use by alert log management logic 300.

The alert log management logic 300 can include program code enabled to receive issued ones of the alerts 260 and insert them in an activity log within one of the activity threads 270 including the activity object giving rise to the issued one of the alerts 260. In this regard, the program code of the alert log management logic 300 can be enabled not only to include issued ones of the alerts 260 in respective alert logs for corresponding ones of the activity threads 270, but also to provide access to the issued ones of the alerts 260 within the respective alert logs. By access it is meant that upon the selection of an alert in an alert log, information pertaining to the selected alert can be provided including the alert content, when the alert had been issued and to whom, and how the recipient of the alert have responded.

Figure 3:
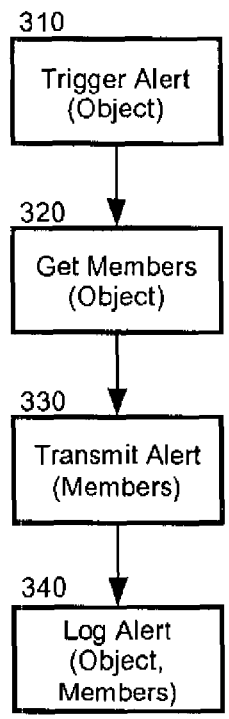
Figure 4:
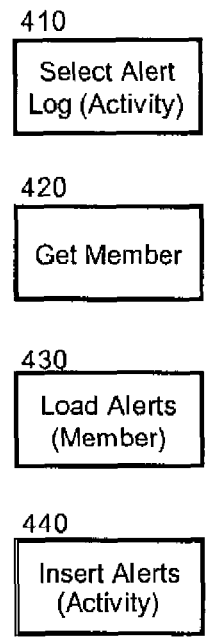

In even yet further illustration, FIGS. 3 and 4, taken together, are a flow chart illustrating a process for activity thread integration of an alert log. Beginning in block 310 of FIG. 3, an alert can be triggered in association with an object for an activity represented by an activity thread. In block 320, the members of the activity object can be determined and in block 330, the alert can be transmitted to each of the members of the activity object. Finally, in block 340 the alert can be logged for the activity object for each of the members of the activity object.

Turning now to FIG. 4, in block 410 an alert log can be selected for population within activity thread. Thereafter, in block 420 the member viewing the activity thread can be determined. In block 430, all alerts associated with the member can be retrieved for inclusion in the alert log. Finally, in block 440 the retrieved alerts can be inserted into the activity log. In this way, the member can view the alerts and related information, even if the member had initially failed to notice one or more of the alerts due to the transient and ephemeral nature of the display of the alerts.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An activity-centric collaboration data processing system configured for alert management, the system comprising:
    an activity-centric collaboration tool executing in memory by at least one processor of a host computing platform coupled to one or more client computing platforms over a computer communications network;
    an activity map provided by the activity-centric collaboration tool and configured to display an activity thread for an activity;
    an alert log management logic comprising program code enabled to log a reference to an alert for the activity in the activity thread, and in response to the selection of the alert from within the activity thread, to display the content of the alert; and,
    an alert log disposed in the activity thread as a branch of the activity thread containing only previously issued alerts.

2. The system of claim 1, wherein the activity log comprises individual references to different, previously issued alerts.

3. The system of claim 1, wherein the program code of the alert log management logic is further enabled to display when the alert had previously been issued.

4. The system of claim 1, wherein the program code of the alert log management logic is further enabled to display a list of members to whom the alert had previously been issued.

5. The system of claim 4, wherein the program code of the alert log management logic is yet further enabled to display a list of actions taken by the members in response to having received the alert.

6. The system of claim 4, wherein the program code of the alert log management logic is yet further enabled to display a list of ratings applied by the members in response to having received the alert.

* * * * *